Feb. 28, 1939.                R. BINDER ET AL                2,149,040
                          HYDRAULIC SHOCK ABSORBER
                            Filed March 22, 1938
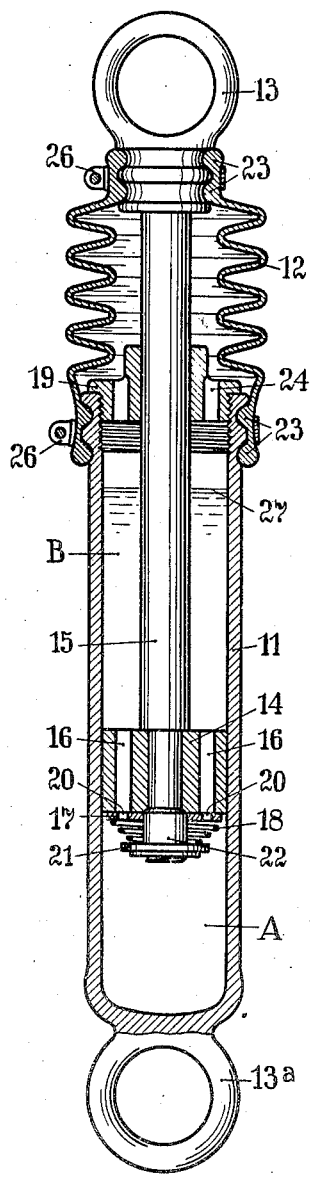
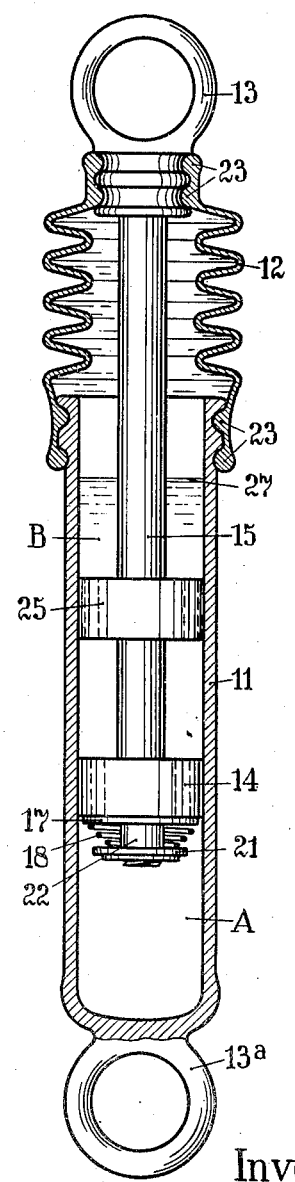
Inventors
Richard Binder & Hermann Klein
Per Dean, Fairbank & Hirsch.
Attorneys.

Patented Feb. 28, 1939

2,149,040

UNITED STATES PATENT OFFICE 2,149,040

HYDRAULIC SHOCK ABSORBER

Richard Binder and Hermann Klein,
Schweinfurt, Germany

Application March 22, 1938, Serial No. 197,320
In Germany March 30, 1937

3 Claims. (Cl. 188—88)

This invention relates to hydraulic shock absorbers for vehicles and other purposes and more particularly to that construction in which a piston is movable in a cylinder, the piston and the cylinder being attached to relatively movable spring-connected parts of a vehicle so that the said two elements of the shock absorber directly control the undulating movements of the interconnected parts of the vehicle.

The object of the invention is to provide means allowing the free movement of the piston in its upward stroke within the cylinder when the working liquid is transferred from a discharge chamber into a pressure chamber while upon the return stroke of the absorber and the displaced vehicle parts the liquid is forced through narrow passages disposed in a valve member of the reciprocable piston and leading from the pressure chamber into the discharge chamber thereby gradually decreasing and damping the oscillations of the controlled parts.

A further object is to provide an entirely closed absorber casing excluding entrance of dust, moisture and other troubling substances but allowing free passage into and out of the receiving chamber during the working and return strokes of the piston without generating therein undue air compression and depression respectively.

These objects are attained by the provision of a cylinder entirely closed at its bottom end, while the interior of this cylinder is by the piston reciprocated therein separated into a pressure chamber and a liquid-receiving chamber of variable volumes according to the operation of the absorber. The liquid-receiving chamber is further completed by an extensible and contractile, preferably foldable member closing, and connected to, the open end of the cylinder and attached to the head of the piston rod, thereby enclosing the piston rod and protecting same from abrasive substances. This foldable member or envelope which is in open connection with the said receiving chamber of the absorber accommodates its volume to the respective pressures generated in the receiving chamber and eventually even admits part of the working liquid.

In the accompanying drawing, which forms a part of this specification, two embodiments of the invention are represented by way of example and in this drawing is—

Fig. 1 a vertical sectional elevation of the shock absorber according to the first construction, and Fig. 2 a similar sectional view of the second constructional embodiment.

Like numerals designate like or similar parts in both figures.

The shock absorber according to the invention comprises a cylinder 11 the lower end of which is closed, a piston 14 lengthwise displaced therein by means of the pertinent piston rod 15 and a flexible tubular member 12 air-tightly attached with its upper extremity to the free end of the piston rod and with its lower end to the upper open end of the cylinder, thus enclosing the piston rod and being movable with the same. Working liquid is contained in the cylinder and forced upwards and downwards through a valve provided in the piston as the latter is reciprocated in the cylinder.

The resilient member 12 of a preferred construction made of pliant or flexible impervious material, such as rubber, leather or impregnated fabric, is rendered extensible and collapsible, so as to follow the reciprocation of the piston rod, by folds circumferentially arranged on the tubular member 12 similarly to a bellow of an accordion. The ends of the member 12 are joined to the piston rod 15 and to the cylinder 11 by means of rounded lips 23 formed on the inner face of the ends of the resilient member 12 and engaged into corresponding circumferential grooves of the piston rod and cylinder respectively, annular clips 26 being eventually provided for securing said lips in the grooves.

The piston 14 which separates the interior of the cylinder into a lower pressure chamber A and an upper receiving chamber B is pierced by a number of axial channels 16, a valve disc 17 being pressed to the lower face of the piston through a spring 18 secured upon the end pin 22 of the piston rod by a washer 21. In line with the bores 16 of the piston 14 there are provided in the valve disc 17 perforations 20 of small diameter permitting the passage of the working liquid from the pressure chamber A to the receiving chamber B during the downward stroke of the piston, when the plate 17 is in its closing position.

A cap or cover 19 constituting the guide of the piston rod 15 is fixed in the upper open end of the cylinder 11, axial bores 24 interconnecting the interior of the cylinder 11 with the interior of the flexible member 12.

When the shock absorber by its eyes 13 and 13a is respectively fastened to the frame and axle of a vehicle and the cylinder filled with working liquid, such as oil, about to the level 27 the shock absorber operates as follows:

On upward moving of the piston 14 relatively to the cylinder 11 the valve plate 17 will be lifted from its seat on the piston and give the liquid a free downward passage through the bores 16 and then be automatically closed so that with the subsequent downward stroke the liquid confined in the chamber A will present a high resistance as it can only pass through the perforations 20 into the chamber B, thus resulting in an effective damping of the oscillations of the vehicle.

The construction of the shock absorber shown in Fig. 2 differs from the embodiment according to Fig. 1 in that the cover 19 is removed and a supplemental piston-like guide member 25, provided with passages comparable to passages 24 in Fig. 1, is fixed on the piston rod 15 above the piston 14.

The air and liquid-tight joint of the flexible member with the cylinder will avoid loss of working liquid when the vehicle takes an inclined position. On the other hand the open communication of the two parts permits of the adaptation of the volume to variations of pressure in the cylinder.

We claim:

1. In a hydraulic shock absorber, the combination with a cylinder closed at its one end, of a piston reciprocating therein, passages for the working liquid formed in the piston, a spring controlled check-valve acting in connection with said passages and having by-passes of damping effect, a piston rod partially projecting out of the cylinder, a supplemental guide element for the piston rod having liquid passages, an expansible and collapsible casing made of flexible material, said casing being in open communication with the interior of the cylinder and fixed on the cylinder and piston rod, respectively, in such a manner that it constitutes the axial extension of the cylinder and encloses the projecting part of the piston rod, and means for air-tightly securing the flexible casing on its seats upon the cylinder and piston rod.

2. In a hydraulic shock absorber, the combination with an upstanding cylinder closed at its lower end, of a piston reciprocable therein, and having passages for the working liquid, a spring controlled check-valve controlling the flow of working liquid through said passages and having by-passes of damping effect, a piston rod connected to said piston and partially projecting out of the upper end of said cylinder, a supplemental guide element for the piston rod having liquid passages, an expansible and collapsible casing at the upper end of said cylinder made of flexible impervious material and adapted to receive liquid out of the cylinder during the up stroke of the piston, said casing being in open communication with the upper open end of said cylinder, and being fixed on the cylinder and piston rod respectively in such a manner that it constitutes the axial extension of the cylinder and encloses the projecting part of the piston rod, and means for air-tightly securing the flexible casing on its seats upon the cylinder and piston rod.

3. In a hydraulic shock absorber, the combination with a cylinder closed at one end, of a piston reciprocable therein, and having passages for the working liquid, a spring controlled check-valve acting in connection with said passages, by-pass conduits of damping effect carried by said piston, a piston rod connected to said piston and partially projecting out of the cylinder at its upper end, an expansible and collapsible casing made of flexible impervious material connected at said upper end of said cylinder, said casing being in open communication with the interior of said cylinder, and being fixed on the cylinder and piston rod respectively in such a manner that it constitutes the axial extension of said cylinder and encloses the projecting part of the piston rod, the ends of said casing having circumferential inwardly projecting rounded lips extending air-tightly into corresponding circumferential grooves on said cylinder and piston rod respectively.

RICHARD BINDER.
HERMANN KLEIN.